United States Patent

Kaplan et al.

[11] Patent Number: 5,889,126
[45] Date of Patent: Mar. 30, 1999

[54] AMORPHOUS AND/OR SEMICRYSTALLINE COPOLYESTERS CONTAINING β-HYDROXYALKYLAMIDE GROUPS, METHOD FOR THEIR MANUFACTURE, AND UTILISATION OF THE ESTERS

[75] Inventors: Andreas Kaplan; René Gisler; Eberhard Kinkelin, all of Chur, Switzerland

[73] Assignee: EMS-Inventa AG, Zurich, Switzerland

[21] Appl. No.: 891,574

[22] Filed: Jul. 11, 1997

[30] Foreign Application Priority Data

Jul. 12, 1996 [DE] Germany .................. 196 28 262.4
Feb. 3, 1997 [DE] Germany .................. 197 03 952.9

[51] Int. Cl.[6] ............................................. C08F 20/00
[52] U.S. Cl. ..................... 525/444; 528/272; 528/275; 528/288; 525/437; 525/540; 524/714; 524/765
[58] Field of Search ........................... 528/272, 275, 528/288; 525/437, 444, 540; 524/714, 765

[56] References Cited

U.S. PATENT DOCUMENTS 4,076,917  2/1978  Swift et al. .................. 526/49
4,101,606  7/1978  Cenci et al. .................. 525/218
4,801,680  1/1989  Geary et al. .................. 528/272

Primary Examiner—Samuel A. Acquah
Attorney, Agent, or Firm—Marshall & Melhorn

[57] ABSTRACT

The invention relates to Amorphous and/or semicrystalline copolyesters containing β-hydroxyalkylamide groups according to formula (I)

$$P-(CO-N-CHR_3-CH-OH)_n, \quad (I)$$
$$\phantom{P-(CO-N}|\phantom{CHR_3-}|$$
$$\phantom{P-(CO-N}R_1\phantom{CHR_3}R_2$$

wherein
P = polymer chain of the polyester
R1 = alkyl residues with 1–5 atoms or hydrogen or $$(HO-CH-CH_2)-$$
$$\phantom{(HO-CH}|$$
$$\phantom{(HO-CH}R_2$$

R2 = alkyl residues with 1–5 C-atoms or hydrogen,
R3 = alkyl residues and 1–5 C-atoms or hydrogen, and
$n \geq 2$,
with a molecular weight (Mn) of 300 to 15,000 and a hydroxyl value of 10 to 400 [mg KOH/g].

18 Claims, No Drawings

AMORPHOUS AND/OR SEMICRYSTALLINE COPOLYESTERS CONTAINING β-HYDROXYALKYLAMIDE GROUPS, METHOD FOR THEIR MANUFACTURE, AND UTILISATION OF THE ESTERS

The present invention relates to amorphous and/or semicrystalline copolyesters containing β-hydroxyalkylamide groups, a method for manufacturing them and their use as cross-linkers in powder lacquers as well as in lacquers containing solvents and water-dilutable lacquers.

The document U.S. Pat. No. 4,076,917 describes β-hydroxyalkylamides as cross-linkers for carboxyl-functional polyacrylates in lacquers containing solvents and aqueous emulsions, as well as powder lacquers. The monomeric β-hydroxyalkylamides described therein are obtained from the alkyl esters of saturated or unsaturated dicarboxylic acids by conversion with amino alcohols.

The document U.S. Pat. No. 4,801,680 described powder lacquers containing as binders β-hydroxyalkylamides and carboxyl-functional copolyesters. The monomeric β-hydroxyalkylamides described therein are likewise obtained from the alkyl esters of saturated or unsaturated dicaboxylic acids by conversion with amino alcohols.

The document U.S. Pat. No. 4,101,606 describes β-hydroxyalkylamide polymers as cross-linkers for polymers with a carboxyl or anhydride function in solvent-containing lacquers and aqueous emulsions as well as powder lacquers. These β-hydroxyalkylamide polymers are polyacrylates wit β-hydroxyalkylamide groups, which are obtained by radical copolymerisation from β-hydroxyalkylamides with a vinyl group and further unsaturated compounds.

Amorphous and/or semicrystalline copolyesters with β-hydroxyalkylamide groups were not previously known.

Proceeding from this pint it is the object of the present invention to propose suitable polyesters containing β-hydroxyalkylamide groups, and a method for their manufacture.

This object is achieved by the characterising features of claim 1, and the method for their manufacture by the features of claim 2. The utilisation of the polyesters is indicated in claim 9. The secondary claims illustrate advantageous further developments.

The amorphous and/or semicrystalline copolyesters containing β-hydroxyalkylamide groups correspond to Formula (i).

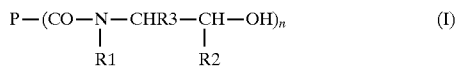  (I)

F:being the polymer chain of the polyester
R1=alkyl residues with 1–5 Atoms or hydrogen or

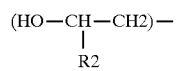

R2=alkyl residues with 1–5 C-atoms or hydrogen,
R3=alkyl residues and 1–5 C-atoms or hydrogen, and
$n \geq 2$, preferably 2–100,
with a molecular weight (Mn) of 300 to 15,000 and a hydroxyl value of 10 to 400 [mg KOH/g].

Surprisingly, it became apparent that amorphous and/or semicrystalline copolyesters containing β-hydroxyalkylamide groups are eminently suitable as cross-linkers for carboxyl- and/or anhydride-functional compounds, as well as those containing isocyanate, in powder lacquers and in lacquers continuing solvents, and water-dilutable lacquers.

The amorphous and/or semicrystalline copolyesters containing β-hydroxyalkylamide groups according to the invention are obtained either by conversion of carboxyl-functional amorphous and/or semicrystalline copolyesters with amino alcohols in the melt, or in solvents at temperatures of 80° C. to 260° C., and if necessary in the presence of suitable catalysts, or preferably by the conversion of amorphous and/or semicrystalline copolyesters containing alkylester groups with amino alcohols, conversion being carried out either in the melt or in suitable solvents at temperatures from 80° C. to 260° C., if necessary in the presence of suitable catalysts. Preferred alkylester groups are methylester groups. The following are mentioned by way of example as catalysts: sodium or potassium methylate, potassium tertiary butylate etc.; quaternary ammonium alcoholates such for example as tetraammonium methylate etc.; alkali metals; alkali hydroxides such for example as sodium or potassium hydroxide and ammonium hydroxide.

The following are named by way of example as amino alcohols: 2-aminoethanol, 2-methylaminoethanol, 2 ethylaminoethanol, 2-n-propylaminoethanol, 2,2'iminodiethanol, 2-aminopropanol, 2,2'-iminodiisopropanol, 2-aminocyclohexanol, 2-aminocyclopentanol, 2-aminomethyl 2-methyl-ethanol 2-n-butylaminoethanol, 2-methylamino-1,2 dimethylethanol, 2-amino-2-methyl-1-propanol, 2-amino-2 methyl-1,3-propanediol, 2-amino-2-ethyl-1,3-propanediol, 2-amino-2-hydroxymethyl-1,3-propanediol and 1-amino-2 propanol.

The amorphous and/or semicrystalline copolyesters containing alkylester groups are obtained either by the known ester-interchange methods from the alkylesters of di- or polyfunctional carboxylic acids with di- or polyfunctional alcohols in the melt or in solvents at temperatures of 80° C. to 260° C. in the presence of suitable catalysts, such for example as titanium tetrabutylate, or by a conversion, analogous to polymers, of hydroxyl-functional amorphous and/or semicrystalline copolyesters with the alkylesters of di- or polycarboxylic acids in the melt or in suitable solvents at temperatures of 80° C. to 260° C. in the presence of suitable catalysts.

Preferred alkylesters of polycarboxylic acids are dimethyl terephthalate and dimethyl adipate. The usual acidic or basic ester-interchange catalysts, such for example as titanium tetrabutylate, are suitable as catalysts.

The amorphous and/or semicrystalline hydroxy-functional copolyesters can be produced according to the condensation method known for polyesters (esterification and/or ester interchange) according to prior art. Suitable catalysts, such for example as dibutyl tin oxide or titanium tetrabutylate can also if necessary be used.

Suitable amorphous hydroxy-functional copolyester resins have a hydroxyl value of 10–200 [mgh KOH/g] and a glass transition temperature of >10° C. amorphous hydroxy-functional copolyesters contain as acidic components mainly aromatic multi-basic carboxylic acids such for example as terephthalic acid, isophthalic acid, phthalic acid, pyromellitic acid, trimellitic acid, 3,6-dichlorophthalic acid, tetrachlorophathalic acid and, as far as available, their anhydride, chloride or ester. The usually contain at least 50 Mol-% terephthalic acid and/or isophthalic acid, preferably 80 Mol-%. The remainder of the acids (difference from 100 Mol-%) consists of aliphatic and/or cycloaliphatic multi-basic acids such for example as 1,4-cyclohexanedicarboxylic acid, tetrahydrophthalic acid, hexahydroendomethylene terephthalic acid, hexachlorophthalic acid, azelaic acid, sebacic acid, decandicarboxylic acid, adipic acid, dodecandicarboxylic acid, succinic acid, maleic acid or dimeric fatty acids. Hydroxycarboxylic acids and/or lactones such for example as 12-hydroxystearic acid, Epsilon-Caprolacton or hydroxypivalic acid ester of neopentyl glucol, can likewise be used. Monocarboxylic acids, such for example as benzoic acid, tertiary butylbenzoic acid, hexahydrobenzoic acid and saturated aliphatic monocarboxylic acids are also used in small quantities.

The following aliphatic diols are named by way of example such for example as ethylene glycol, 1,3-propanediol, 1,2 propanediol, 1,2 butanediol, 1,3-butanediol, 1,4 butanediol, 2,2-dimethylpropanediol-1,3 (neopentyl glycol), 2,5-hexandiol, 1,6-hexandiol, 2,2-[bis-(4 hydroxycyclohexyl)]propane, 1,4 dimethylolocyclohexane, diethylene glycol, dipropylene glycol and 2,2-bis-[4-(2-hydroxy)]phenylpropane.

Polyols are used in small quantities, e.g. glycerol, hexanetriol, pentaeryltritol, sorbitol, trimethylolethane, trimethylolpropane and tris(2-hydroxy)isocyanurate. Epoxy compounds can also be used instead of diols or polyols. The proportion of neopentyl glycol and/or propylene glycol in the alcohol component preferably comes to at least 50 Mol-% relative to total acids.

Suitable semicrystalline polyesters have a hydroxyl value of 10–400 [mg KOH/g] and a precisely-defined DSC melting point. The semicrystalline polyesters are condensation products from aliphatic polyols, preferably, aliphatic diols and aliphatic and/or cycloaliphatic and/or aromatic polybasic carboxylic acids, preferably dibasic acids. The following are named by way of example as aliphatic polyols: ethylene glycol (1,2-ethanediol), propylene glycol (1,3 propanediol), butylene glycol (1,4 butanediol), 1,6 hexanediol, neopentylglycol, cyclohexanedimethanol, trimethylolpropane etc. Preferred are aliphatic diols, e.g. ethylene glycol, butylene glycol or 1,6-hexanediol.

Suitable polybasic carboxylic acids are aliphatic carboxylic acids, preferably C4–C20 dicarboxylic acids such for example as adipic acid, azelaic acid, sebacic acid, dodecandicarboxylic acid, succinic acid, undecandicarboxylic acid, and aromatic dicarboxylic acids such for example as terephthalic acid, isophtalic acid, phthalic acid and their hydrogenation products such for example as 1,4-cyclohexanedicarboxylic acid. Aliphatic dicarboxylic acids with 6 to 12 carbon atoms are preferred. Naturally, mixtures of various polyols and polybasic carboxylic acids can be used.

As hardening agents for these amorphous and/or semicrystalline copolyesters containing β-hydroxyalkylamides in the thermohardening lacquers, there may be used aliphatic polybasic acids, preferably dibasic acids such for example as adipic acid, pimelic acid, suberic acid, azelaic acid, sebacic acid, malonic acid, succinic acid, glutaric acid, 1,12-dodecandiacid, etc. The anhydrides of these acids can likewise be used, e.g. glutaric acid anhydride, succinic acid anhydride, and the polyanhydrides of these dicarboxylic acids. These polyanhydrides are obtained by intermolecular condensation of the named aliphatic dibasic dicarboxylic acids.

Examples are adipic acid(poly)anhydride, azelaic acid (poly)anhydride, sebacic acid(poly) anhydride, dodecandiacid (poly)anhydride etc. The polyanhydrides have a molecular weight (weight average in relation to polystryol standard) of 1000–5000. The polyanhydrides can also be modified with polyol.

The polyanhydrides can also be used in mixture with the aliphatic dibasic dicarboxylic acids as hardening agents, or in mixture with hydroxycarboxylic acids which have melting points between 40° and 150° C., e.g. 12-hydroxystearic acid, 2- or 3- or 10-hydroxyoctadecanic acid, 2-hydroxymyristinic acid.

Cycloaliphatic dicarboxylic acids such for example as 1,4-cyclohexanedicarboxylic acid or its polyanhydrides can be used as hardeners.

Suitable hardeners are also amorphous and semicrystalline copolyesters.

Both the amorphous and the semicrystalline copolyesters can be produced according to the condensation method known for polyesters (esterification and/or ester interchange) according to prior art. Suitable catalysts such for example as dibutyl tin oxide or titanium tetrabutylate can if necessary also be used.

Suitable amorphous carboxyl-functional copolyester resins have an acidic value of 10–200 [mg KOH/g] and a glass transition temperature of >10° C. Amorphous carboxyl-functional copolyesters contain as acid components mainly aromatic polybasic carboxylic acids such for example as terephthalic acid, isophthalic acid, phtalic acid, pyromellitic acid, trimellitic acid, 3,6-dichlorophthalic acid, tetrachlorophthalic acid and, as far as available, their anhydride, chloride or ester. They usually contain at least 50 Mol-% terephthalic acid and/or isophthalic acid, preferably 80 Mol-%. The remainder of the acids (difference from 100 Mol-%) consists of aliphatic and/or cycloaliphatic polybasic acids such for example as 1,4-cyclohexandicarboxylic acid, tetrahydrophthalic acid, hexahydroendomethylenterephthalic acid, hexachlorophthalic acid, azelaic acid, sebacic acid, decandicarboxylic acid, adipic acid, dodecandicarboxylic acid, succinic acid, maleic acid or dimeric fatty acids. Hydroxycarboxylic acids and/or lactones such for example as 12-hydroxystearic acid, Epsilon-Caprolacton or hydroxypivalic acid esters of neopentylglycol, can also be used.

Monocarboxylic acids, such for example as benzoic acid, tertiary butylbenzoic acid, hexahydrobenzoic acid and saturated aliphatic monocarboxylic acids can also be used in small quantities.

The following are mentioned by way of example as suitable alcohol components: ethylene glycol, 1,3-propanediol, 1,2 propanediol, 1,2 butanediol, 1,3-butanediol, 1,4 butanediol, 2,2-dimethylpropanediol-1,3 (neopentylglycol), 2,5 hexandiol, 1,6-hexandiol, 2,2-[bis-(4 hydroxycyclohexyl)]propane, 1,4 dimethylolocyclohexane, diethylene glycol, dipropylene glycol and 2,2-bis-[4-(2-hydroxy)]phenylpropane. Polyols are also used in small quantities, e.g. glycerol, hexanetriol, pentaeryltritol, sorbitol, trimethylolethane, trimethylolpropane and tris(2-hydroxy)isocyanurate. Epoxy compounds can also be used instead of diols or polyols. The proportion of neopentyl glycol and/or propylene glycol in the alcohol component preferably comes to at least 50 Mol-% relative to total acids.

Suitable semicrystalline polyesters have an acidic value of 10–400 [mg KOH/g] and a precisely-defined DSC melting point. The semicrystalline polyesters are condensation products from aliphatic polyols, preferably aliphatic diols, and aliphatic and/or cycloaliphatic and/or aromatic polybasic carboxylic acids, preferably dibasic acids. The following are mentioned by way of example as aliphatic polyols: ethylene glycol (1,2-ethanediol), propylene glycol (1,3propanediol), butylene glycol (1,4 butanediol), 1,6 hexanediol, neopentylglycol, cyclohexanedimethanol, trimethylolpropane etc. Preferred are aliphatic diols, e.g. ethylene glycol, butylene glycol or 1,6-hexanediol.

Suitable polybasic carboxylic acids are aliphatic dicarboxylic acids, preferably C4–C20 dicarboxylic acids such for example as adipic acid, azelaic acid, sebacic acid, dodecandicarboxylic acid, succinic acid, undecandicarboxylic acid, and aromatic dicarboxylic acids such for example as terephthalic acid, isophtalic acid, phthalic acid and their hydrogenation products such for example as 1,4-cyclohexanedicarboxylic acid. Preferred are aliphatic dicarboxylic acids with 6 to 12 carbon atoms. Mixtures of various polyols and polybasic carboxylic acids can of course also be used.

Suitable carboxyl-functional acrylate polymers have an acidic value of 10–300 [mg KOH/g], produced by copolymerisation of a monomer mixture consisting of:

a) 0 to 70 parts by weight methyl(meth) acrylate,
b) 0 to 60 parts by weight (cyclo)alkyl esters of acrylic and/or methacrylic acid with 2 to 8 carbon atoms in the alkyl or cycloalkyl residue,
c) 0 to 90 parts by weight vinyl aromatics
d) 0 to 60 parts by weight of olefinic unsaturated carboxylic acids, the sum of the weight proportions of the components a) to d) coming to 100.

The b) monomers are preferably (cyclo) alkyl esters of acrylic or methacrylic acid with 2 to 18 carbon atoms in the (cyclo) alkyl residue. Examples of suitable or preferably suitable b) monomers are ethyl (methyl) acrylate, n propyl (meth) acrylate, isopropyl (meth) acrylate, n-butyl (meth) acrylate, isobutyl (meth) acrylate, tert.-butyl (meth) acrylate, 2-ethylhexyl (meth) acrylate, cyclohexylmethacrylate, neopentylmethacrylate, isobornylmethacrylate, 3,3,5-trimethylcyclohexylmethacrylate and stearylmethacrylate.

Styrol, vinyl toluol and α-ethylatyrol are considered as monomers.

Examples of d) are acrylic and methacrylic acid, which are also preferably used and also crotonic acid, itaconic acid, fumaric acid, maleic acid and citraconic acid.

The copolymerisates can be produced by copolymerisation of the a) to d) monomers named by way of example according to conventional radical polymerisation methods, such for example as solution, emulsion, pearl or mass polymerisation. The monomers are copolymerised at temperatures of 60° to 160° C., preferably 80° to 150° C., in the presence of radical formers and if necessary molecular weight chain-transfer agents.

The carboxyl-functional acrylate copolymerisates are produced in inert solvents. Suitable solvents are for example aromatics such as benzol, toluol, xylol; esters, such as ethylacetate, butylacetate, hexylacetate, heptylacetate methylglycolacetate, ethylglycolacetate, methoxypropylacetate; ethers, such as tetrahydrofuran, dioxan, diethyleneglycoldimethylether; ketones, such as acetone, methethylketone, methylisobutylketone, methyl-n amylketone, methylisoamylketone or any mixtures of such solvents.

Manufacture of the copolymerisates can be carried out continuously or discontinuously. Conventionally, a monomer mixture and the initiator are metered uniformly and continuously into the polymerisation reactor, and at the same time the corresponding quantity of polymerisate is continuously removed. Thus chemically almost homogeneous copolymers can be produced. Chemically almost homogeneous copolymers can also be produced by running the reaction mixture at constant speed into a stirred-tank reactor, without removing the polymerisate.

It is also possible initially to place a proportion of the monomers, for example in solvents of the named type, and to add the remaining monomers and auxiliary agents separately or in common into this preliminary container at reaction temperature.

Polymerisation generally takes place at atmospheric pressure, but can also be carried out at pressure of up to 25 bar. The initiators are added in quantities of 0.5 to 15% by weight relative to the total quantity of monomers.

Suitable initiators are conventional radical starters such for example as aliphatic azo compounds such as azodiisobutyric acid nitrile, azo-bis-2-methylvaleronitrile, 1,1,'-azobis-1-cyclohexanentrile and 2,2'-azo-bis-isobutyric acid alkyl ester; symmetrical diacyl peroxides such for example as acetyl-, propionyl- or butyryl peroixde, with bromo-, nitro-, methyl- or methoxy group-substituted benzoyl peroxides, lauryl peroxides; symmetrical peroxydicarbonates, e.g. tert.-butylperbenzoate; hydroperoxides such for example as tert.-butylhydroxyperoxide, cumenehydroxyperoxide; dialkyl peroxides such as dicumylperoxide, tert.-butylcumylperoxid or Di-tert.-buytylperoxide.

In order to regulate the molecular weight of the copolymerisates, conventional chain-transfer agents can be used in production. Named by way of example are mercaptopropionic acid, tert.-docecylmercaptane, n-dodecylmercaptane or diisopropylxanthogene disulphide. The regulators can be added in quantities from 0.1 to 10% by weight relative to the total quantity of monomers.

The solutions of copolymerisates resulting during copolymerisation can then be passed on to the evaporation of degassing stage without further processing; in these stages the solvent is for example removed in an evaporating extruder or spray drier at about 120° to 160° C. and in a vacuum of from 100 to 300 mbar, and the copolymerisates to be used according to the invention are obtained.

Mixtures of various suitable hardeners can also be used.
The equivalence ratio of β-hydroxyalkylamide to carboxylic acid equivalents lies in the range from 0.6 to 1.6:1.

Naturally the selection of hardener is not restricted to carboxyl- and anhydride-functional compounds. Possible hardeners are all compounds which react with the hydroxyl group of the amorphous and/or semicrystalline copolyesters containing β-hydroxyalkylamide groups, such for example as compounds containing isocyanate. Examples of compounds containing isocyanates are isophorondiisocyanate and its derivatives.

For production of powder lacquers, the conventional pigments and/or fillers and/or additives may be used.

These are additives from the group of accelerators, flow and degassing agents, heat- UV- and/or HALS stabilisers and/or triboadditives and necessary delustrants such for example as waxes.

The production of powder lacquers is preferably effected in the melt by common extrusion of all components of the formulation at temperatures between 60° to 140° C. The extrudate is then cooled, ground and screened to a granular size less than 90 μm. Basically, other methods are suitable for producing powder lacquers, such for example as mixing the components of the formulation in solution with subsequent precipitation or distillative removal of the solvents.

Application of the powder lacquers according to the invention is carried out according to the method conventional for powder lacquers, e.g. by means of electrostatic spray devices (Corona or tribo), or according to the fluidised-bed principle.

For use as lacquers containing solvents, amorphous and/or semicrystalline copolyesters containing β-hydroxyalkylamide groups, the appropriate hardeners and the conventional pigments and additives are dissolved in suitable solvents. Production is carried out according to the method normal for lacquers containing solvents.

Solvents contain aromatics such for example as toluol, xylol etc; aliphatics such e.g. as heptane, octane etc; water, dimethyl formamide, dimethyl sulphoxide, and also halogen-containing solvents, ether, esters and alcohols, depending on the solubility of the ingredients of the formulation.

Water-dilutable lacquers are produced from salts of the carboxyl-functional hardeners, e.g. amino salts such as dimethylaminoethanol, trimethylamine, triethylamine, diethanolamine, methylethanolamine or ammonium salts etc, if necessary with other suitable hardeners and the amorphous and/or semicrystalline copolyesters containing β-hydroxyalkylamide groups, according to the usual methods with the conventional pigments and additives.

Examples of production and properties of the amorphous and/or semicrystalline copolyesters containing β-hydroxyalkylamide groups according to the invention are given in the following.

Production of the Copolyesters Containing β-hydroxyalkylamide Groups

EXAMPLE 1

501.8 g (4.82 Mol) of neopentyl glycol are preliminarily placed in a 2-esterification reactor provided with temperature sensor, stirrer, reflux column and distillation bridge, and melted at 140° C. in a nitrogen atmosphere which is maintained during the entire reaction. 533.3 g (3.21 Mol) of isophthalic acid, 138.2 g (0.80 Mol) of cyclohexane dicarboxylic acid and 0.6 g of esterification catalyst are added to the stirred mixture. After staged increase in the internal temperature up to 235° C., the reaction is continued until no further distillate appears. Condensation is carried out under vacuum of 20 mbar until a melt viscosity of about 15 Pa*s at 160° C. is attained. After blooming with nitrogen, 0.6 g ester-interchange catalyst and 186.39 g (1.07 Mol) dimethyl adipate are added. The reaction is continued under vacuum of 100 mbar until no further methanol appears. After renewed blooming with nitrogen 80.37 g (1.07 Mol) of 1-amino-2-propanol are added. Under vacuum of 100 mbar, the reaction is continued until no further methanol appears.

The polyester obtained has an acidic value of <2 mg KOH/g, a hydroxyl value of 60 mg KOH/g and an ICI melt viscosity at 160° C. of 14 Pa*s.

The molecular weight calculated as a numerical average from the terminal group concentrations, comes to about 1700.

EXAMPLE 2

533.1 g (4.51 Mol) of hexandiol are first placed in a test apparatus analogous to that in Example 1, and melted in a nitrogen atmosphere maintained during the entire reaction at 140° C. 629.3 g (2.73 Mol) of dodecandiacid and 0.6 g of esterification catalyst are added to the stirred mixture.

After staged increase in the internal temperature up to 235° C., the reaction is continued until no further distillate appears.

After blooming with nitrogen, 0.6 g ester-interchange catalyst and 620.15 g (3.56 Mol) dimethyl adipate are added.

The reaction is continued under vacuum of 100 mbar until no further methanol appears. After renewed blooming with nitrogen, 217.45 g (3.56 Mol) of 2-aminoethanol are added. The reaction is continued under vacuum of 100 mbar until no further methanol appears. The polyester obtained has an acidic value of <2 mg KOH/g, a hydroxyl value of 199 mg KOH/g and an ICI melt viscosity at 160° C. of 2 Pa*s.

The molecular weight calculated as a numerical average from the terminal group concentrations, comes to about 550.

Production of a Carboxyl-Functional Copolyester

EXAMPLE 3

400.3 g (3.84 Mol) of neopentyl glycol and 19.2 g (0.31 Mol) are preliminarily placed in a 2 1-esterification reactor provided with temperature sensor, stirrer, reflux column and distillation bridge, and melted at 140° C. in a nitrogen atmosphere which is maintained during the entire reaction. 557.4 g (3.36 Mol) of terephthalic acid, 58.7 g (0.35 Mol) of isophthalic acid and 0.6 g of esterification catalyst are added to the stirred mixture. After staged increase in the internal temperature, the reaction is continued until no further distillate appears. Then 88.0 g (0.53 Mol) of isophthalic acid and 25.8 g (0.18 Mol) of adipic acid are added and esterised until the desired acidic value range of 30 to 36 mg KOH/g is reached. A portion of this second stage can be carried out at reduced pressure (<100 mbar).

The polyester obtained has an acidic value of 33 mg KOH/g and an ICI melt viscosity at 160° C. of 40 Pa*s.

The molecular weight calculated as a numerical average from the terminal group concentrations, comes to about 2800.

Production of a Thermohardening Lacquer

EXAMPLE 4

346.5 g of the copolyester containing β-hydroxyalkylamide groups from Example 1, 643.5 g of the carboxyl-functional copolyester from Example 3, 8 g Resiflow PV 88 (flow agent on polyacrylate base, commercial product of Worleè-Chemie GmbH) and 2 g benzoin are mixed dry in a Henschel mixer at 700 rpm for 30 sec., and then extruded on a Buss-Co kneader (PLK 46) at a jacket temperature of 100° C., with cooled worm conveyor and a worm rotary speed of 150 rpm. The extrudate is cooled, ground and screened to less than 90 μm.

The powder lacquers are applied electrostatically (Corona or Tribo) to aluminum plates (Q-panel AL-36 505 H 14/08 [0.8 mm]), and hardened at a firing temperature of 200° C. and a firing time of 15 min. The layer thickness is 60 μm.

Table 1 shows the technical properties of the lacquer.

EXAMPLE 5

| Hardening Component | |
|---|---|
| copolyester containing β-hydroxyalkylamide groups from Example 2 | 75 g |
| benzoin | 2 g |
| dimethyl sulphoxide | 100 g |
| Resin Component | |
| carboxyl-functional copolyester from Example 3 | 425 g |
| Resiflow PV 88 (flow agent on polyacrylate base, comm. Product of Worleè-Chemie GmbH) | 8 g |
| Propylene glycol monomethyl ether | 200 g |
| xylol | 190 g |

The hardening components and the resin component are dissolved separately at 60° C. in a 3-liter stirring vessel, and mixed shortly before application.

Then a film of 200 μm is applied by a film-application apparatus to aluminum plates (Q-panel AL-36 5005 H 14/08 [0.8 mm]), and hardened at a firing temperature of 200° C. and a firing time of 15 min. The layer thickness is 55 μm.

Table 1 shows the technical properties of the lacquer.

EXAMPLE 6

| Hardening Component | |
| --- | --- |
| copolyester containing β-hydroxyalkylamide groups from Example 2 | 75 g |
| benzoin | 2 g |
| dimethyl formamide | 23 g |
| water | 100 g |
| Resin Component | |
| carboxyl-functional copolyester from Example 3 | 425 g |
| 2-methylaminoethanol | 19 g |
| Resiflow PV 88 (Flow-control agent on polyacrylate base, commercial product of Worleè-Chemie GmbH) | 8 g |
| Butyl Cellosolve | 48 g |
| Water | 200 g |

The hardening components and the resin component are dissolved separately at 60° C. in a 3-liter stirring vessel, and mixed shortly before application.

Then a film of 200 μm is applied by a film-application apparatus to aluminum plates (Q-panel AL-36 5005 H 14/08 [0.8 mm]), and hardened at a firing temperature of 200° C. and a firing time of 15 min. The layer thickness is 55 μm.

Table 1 shows the technical properties of the lacquer.

TABLE 1

| | Ex. 4 | Ex. 5 | Ex. 6 |
| --- | --- | --- | --- |
| Brilliance (60° DIN 67530) | 105 | 104 | 103 |
| Flow | very good | very good | very good |
| Cupping index (DIN 53156) | 10 | 10 | 10 |
| Grating section (DIN 52151) | 0 | 0 | 0 |
| Impact (ASTM D 2794, rear side) | >160 | >160 | >160 |

We claim:

1. A copolyester comprising β-hydroxyalkylamide groups of formula (I):

$$P-(CO-N(R_1)-CHR_3-CH(R_2)-OH)_n \quad (I)$$

wherein

P is a polymer chain of a polyester;

$R_1$ is selected from the group consisting of alkyl residues having 1 to 5 C-atoms, hydrogen, and a compound of formula (II):

$$(HO-CH(R_2)-CH_2)- \quad (II)$$

$R_2$ is selected from the group consisting of alkyl residues having 1 to 5 C-atoms and hydrogen;

$R_3$ is selected from the group consisting of alkyl residues having 1 to 5 C-atoms and hydrogen; and $n \geq 2$;

said copolyester having a hydroxyl value of 10 to 400 mg KOH/g.

2. The copolyester comprising β-hydroxyalkylamide groups according to claim 1, wherein the copolyester has a molecular weight (Mn) of 300 to 15,000.

3. The copolyester comprising β-hydroxyalkylamide groups according to claim 1, wherein the copolyester comprising β-hydroxyalkylamide groups is amorphous.

4. The copolyester comprising β-hydroxyalkylamide groups according to claim 1, wherein the copolyester comprising β-hydroxyalkylamide groups is semicrystalline.

5. A method for producing a copolyester comprising β-hydroxyalkylamide groups comprising (a) converting a hydroxyl-functional copolyester with a dialkyl ester of a polycarboxylic acid in the presence of an ester interchange catalyst to a copolyester containing alkylester groups; and (b) converting the copolyester containing alkylester groups with an amino alcohol to the copolymer comprising β-hydroxyalkylamide groups of formula (I):

$$P-(CO-N(R_1)-CHR_3-CH(R_2)-OH)_n \quad (I)$$

wherein p is a polymer chain of a polyester;

$R_1$ is selected from the group consisting of alkyl residues having 1 to 5 C-atoms, hydrogen, and a compound of formula (II):

$$(HO-CH(R_2)-CH_2)- \quad (II)$$

$R_2$ is selected from the group consisting of alkyl residues having 1 to 5 C-atoms and hydrogen; and $R_3$ is selected from the group consisting of alkyl residues having 1 to 5 C-atoms and hydrogen; and $n \geq 2$.

6. The method according to claim 5, wherein the hydroxyl-functional copolyester is amorphous.

7. The method according to claim 6, wherein the hydroxyl-functional copolyester has a hydroxyl value of 10 to 200 mg KOH/g.

8. The method according to claim 6, wherein a glass transition temperature of the hydroxyl-functional copolyester is >10° C.

9. The method according to claim 5, wherein the hydroxyl-functional copolyester is semicrystalline.

10. The method according to claim 9, wherein the hydroxyl-functional copolyester has a hydroxyl value of 10 to 400 mg KOH/g.

11. The method according to claim 5, wherein the amino alcohol is selected from the group consisting of 2-aminoethanol, 2-methylaminoethanol, 2-ethylaminoethanol, 2-n-propylaminoethanol, 2,2'-iminodiethanol, 2-aminopropanol, 2,2'-iminodiisopropanol, 2-aminocyclohexanol, 2-aminocyclopentanol, 2-aminoethyl-2-methylethanol, 2-n-butylaminoethanol, 2-methylamino-1,2-dimethylethanol, 2-amino-2-methyl-1-propanol, 2-amino-2-methyl-1,3-propanediol, 2-amino-2-ethyl-1,3-propanediol, 2-amino-2- hydroxymethyl-1,3-propanediol, and 1-amino-2-propanol.

12. The method according to claim 5, wherein the conversion of the copolyester containing alkylester groups with the amino alcohol is carried out in the presence of a catalyst.

13. The method according to claim 12, wherein the catalyst is selected from the group consisting of sodium methylate, potassium methylate, potassium tertiary butylate, quaternary ammonium alcoholates, alkali metals, alkali hydroxides, and ammonium hydroxides.

14. The method according to claim 12, wherein the quaternary ammonium alcoholate is tetraammoniummethylate.

15. The method according to claim 13, wherein the alkali hydroxides are selected from the group consisting of sodium hydroxides and potassium hydroxides.

16. The method according to claim 5, wherein the hydroxyl-functional copolyester is converted with at least one compound selected from the group consisting of dimethyladipate and dimethylterephtalate into a copolyester containing methylester groups.

17. A cross-linker for compounds selected from the group consisting of carboxyl-functional compounds, anhydride-functional compounds, carboxyl- and anhydride functional compounds, and isocyanate containing compounds in lacquerers comprising:

copolyesters comprising β-hydroxyalkylamide groups of formula (I):

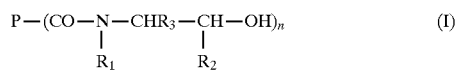

wherein

P is a polymer chain of a polyester;

$R_1$ is selected from the group consisting of alkyl residues having 1 to 5 C-atoms, hydrogen, and a compound of formula (II):

$R_2$ is selected from the group consisting of alkyl residues having 1 to 5 C-atoms and hydrogen;

$R_3$ is selected from the group consisting of alkyl residues having 1 to 5 C-atoms and hydrogen; and $n \geq 2$;

said copolyester having a hydroxyl value of 10 to 400 mg KOH/g.

18. The cross-linker according to claim 17, wherein the lacquers are selected from the group consisting of powder lacquers, lacquers containing solvents, and water-dilutable lacquers.

* * * * *